US00RE45742E

(19) United States
(12) Reissued Patent
Behr et al.

(10) Patent Number: US RE45,742 E
(45) Date of Reissued Patent: Oct. 13, 2015

(54) COVER FOR A REFRIGERATED MERCHANDISING UNIT AND A MERCHANDISING UNIT WITH THE SAME

(71) Applicant: Behr A/S, Hadsten (DK)

(72) Inventors: Kristian Behr, Hadsten (DK); Peter Behr, Hadsten (DK)

(73) Assignee: BEHR A/S, Hadsten (DK)

(21) Appl. No.: 14/260,850

(22) Filed: Apr. 24, 2014

Related U.S. Patent Documents

Reissue of:
(64) Patent No.: 8,162,413
Issued: Apr. 24, 2012
Appl. No.: 10/502,907
PCT Filed: Jan. 24, 2003
PCT No.: PCT/DK03/00046
§ 371 (c)(1),
(2) Date: Jul. 28, 2004
PCT Pub. No.: WO03/063653
PCT Pub. Date: Aug. 7, 2003

(30) Foreign Application Priority Data

Jan. 30, 2002 (EP) ..... 02075390

(51) Int. Cl.
*A47F 3/00* (2006.01)
*A47F 3/04* (2006.01)

(52) U.S. Cl.
CPC ..... *A47F 3/0434* (2013.01)

(58) Field of Classification Search
CPC ..... A47F 3/00; A47F 3/04; A47F 3/043; A47F 3/0434
USPC ..... 312/139.2, 138.1, 114, 330.1, 116; 220/592.02, 592.04, 592.09, 345.5, 220/507
See application file for complete search history.

(56) References Cited

U.S. PATENT DOCUMENTS

| | | | | |
|---|---|---|---|---|
| 166,043 | A * | 7/1875 | Volkland | 312/287 |
| 455,915 | A | 7/1891 | Weiss et al. | |
| 908,199 | A | 12/1908 | Birney | |
| 1,134,540 | A | 4/1915 | Kress | |
| 1,614,319 | A | 1/1927 | Schmidt | |
| 2,039,685 | A | 5/1936 | Enrlich | |
| 2,189,389 | A * | 2/1940 | Baker | 220/345.5 |
| 2,201,435 | A * | 5/1940 | Guyton | 220/345.5 |
| 2,202,684 | A * | 5/1940 | Baker | 312/295 |
| 2,420,879 | A * | 5/1947 | Herter | 49/404 |

(Continued)

FOREIGN PATENT DOCUMENTS

| | | |
|---|---|---|
| DE | 29516629 | 2/1996 |
| DE | 19833958 | 1/2000 |

(Continued)

OTHER PUBLICATIONS

Final Office Action for U.S. Appl. No. 10/502,907, mailed Jan. 23, 2007, 8 pages.

(Continued)

*Primary Examiner* — Patricia Engle
(74) *Attorney, Agent, or Firm* — Perkins Coie LLP

(57) ABSTRACT

A cover for a merchandising display unit (1) disclosed. The cover of the rectangular top opening of the storage compartment includes displaceable lids (9) arranged in two rows along opposing longer sides (2,4) of the storage unit so that access is provided to the storage compartment from both sides of the storage unit. The cover has a stationary cover plate (6) along a mid section of the storage unit and a rail system (5) with a number of parallel transverse rails between the two longer sides, and the lids (9) mounted between separate tracks in adjacent rails and are displaceable in a direction perpendicular to the longer sides (2,4).

15 Claims, 4 Drawing Sheets

(56) References Cited

U.S. PATENT DOCUMENTS

| | | | | | |
|---|---|---|---|---|---|
| 2,534,488 | A | * | 12/1950 | Weber | 62/246 |
| 2,694,613 | A | | 11/1954 | Williams | |
| 2,793,925 | A | * | 5/1957 | Rosen | 312/139.2 |
| 2,929,227 | A | * | 3/1960 | Rainwater | 62/256 |
| 2,946,098 | A | | 7/1960 | Migneault et al. | |
| 2,994,572 | A | * | 8/1961 | Morrison | 312/116 |
| 3,168,172 | A | * | 2/1965 | Alvarez | 496/63 |
| 3,295,907 | A | | 1/1967 | Galvin | |
| 3,410,622 | A | | 11/1968 | Stewart | |
| 3,460,290 | A | * | 8/1969 | Wutzke | 49/411 |
| 3,597,036 | A | * | 8/1971 | Buffington | 312/217 |
| 3,729,243 | A | * | 4/1973 | Musgrave et al. | 312/116 |
| 4,274,267 | A | * | 6/1981 | James et al. | 62/252 |
| 4,449,761 | A | | 5/1984 | Davis et al. | |
| 4,741,570 | A | | 5/1988 | Lovaas | |
| 4,962,865 | A | | 10/1990 | Kakinuma et al. | |
| 5,167,341 | A | * | 12/1992 | Morton et al. | 220/349 |
| 6,017,082 | A | | 1/2000 | Leoni | |
| 6,260,694 | B1 | | 7/2001 | Sasahara | |

FOREIGN PATENT DOCUMENTS

| | | |
|---|---|---|
| EP | 0769262 | 4/1997 |
| EP | 0903095 | 3/1999 |
| EP | 0962729 | 12/1999 |
| JP | 54-23249 | 2/1979 |
| JP | 5423249 | 2/2014 |
| SU | 1518472 | 10/1989 |
| SU | 1518472 A1 | 10/1989 |
| WO | WO-9525254 | 9/1995 |

OTHER PUBLICATIONS

Final Office Action for U.S. Appl. No. 10/502,907, Mailed Mar. 15, 2011, 12 pages.

Non-Final Office Action for U.S. Appl. No. 10/502,907, mailed Jul. 12, 2006, 9 pages.

Non-Final Office Action for U.S. Appl. No. 10/502,907, Mailed Jul. 25, 2011, 13 pages.

Non-Final Office Action for U.S. Appl. No. 10/502,907, Mailed Sep. 30, 2010, 13 pages.

Notice of Allowance for U.S. Appl. No. 10/502,907, Mailed Feb. 22, 2012, 5 pages.

International Search Report; PCT/DK03/00046; Apr. 4, 2003.

English Abstract for Patent No. SU1518472A1.

* cited by examiner

COVER FOR A REFRIGERATED MERCHANDISING UNIT AND A MERCHANDISING UNIT WITH THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This patent application is a reissue application for U.S. Pat. No. 8,162,413, issued from U.S. patent application Ser. No. 10/502,907, filed Jul. 28, 2004, which is a national stage application of International App. No. PCT/DK03/00046, filed Jan. 24, 2003, which claims priority to European Patent Application No. 02075390.1. filed Jan. 30, 2002. The foregoing applications are incorporated herein by reference in their entireties.*

TECHNICAL FIELD OF INVENTION

The present invention relates to a cover for a merchandising display unit, in particular a refrigerated merchandising display unit, for display of goods.

BACKGROUND OF THE INVENTION

For many years, grocery stores have commonly used refrigerating or freezing storage units of the above-mentioned kind, which are accessible from the top along both sides of the unit to allow for an overview of the contents of the storage unit and for free and unhindered access from the top by the customers and the staff.

The refrigerating or freezing merchandising storage unit may be covered with insulation mats during periods in which the grocery store or a similar store is closed in order to reduce energy consumption when storing the goods in the storage unit.

The use of open refrigerating and freezing merchandising storage unit results in extensive losses of energy and it may therefore be provided with an essentially transparent cover. Several examples of covers are known which may be used during opening hours. Thus, refrigerating and freezing storage units provided with a cover by the manufacturer are known. Alternatively, the cover may be retrofitted onto an existing storage unit.

Known covers for refrigerating and freezing merchandising storage units may be divided into two different types. A sliding lid type and a "lift-up" type.

The sliding lid type is of the kind where a cover in the longitudinal direction of the storage unit is typically divided into an appropriate number of plane plates, typically approx. 62.5 cm of width. The individual plates are arranged in two planes so that they may be displaced in the longitudinal direction of the storage unit over, respectively under each other. Examples hereof are known from EP 0 769 262 A2. The plates are transparent which provides for the possibility of examining the goods in the storage unit without having to open it. However, this design only allows for access to the storage compartment in a maximum of half of the longitudinal direction, which limits access to the goods in the storage unit and makes refilling and cleaning of the storage unit difficult since it cannot be opened in the entire longitudinal direction at the same time.

U.S. Pat. No. 2,793,925 discloses a cover with sliding lids that are arranged in two planes and may be displaced in the transversal direction of the storage unit over, respectively under each other. However, the access to the storage compartment is similarly limited to a maximum of half of the top opening area.

The "lift-up" type is of the kind where a cover in the longitudinal direction of the storage unit is divided into an appropriate number of plates, typically 62.5 cm in width. In the width, the lift-up type is divided into two plane plates hinged to a centre console extending in the longitudinal direction so that the individual parts of the 24-hour cover along the longer side of the storage unit may be lifted up and thereby opened. However, operating this type is difficult for little people such as for example children. In addition, a pumping effect is created during opening and closing so that when opened, warm air from the surroundings is sucked into the storage unit and cool air is pumped out into the surroundings when it is closed. This results in an undesirable energy loss.

BRIEF SUMMARY OF INVENTION

The invention provides a cover for a merchandising storage unit of the initially mentioned kind which provides for simultaneous or unhindered access to the storage compartment of the merchandising unit in its entire longitudinal direction along both longer sides without the disadvantages mentioned above, and in particular, the invention avoids unnecessary energy loss when operating the cover of a refrigerated storage unit. Moreover, the invention provides a cover for a merchandising unit, which ensures good access to the contents of the merchandising unit from the top on both sides and which allows the customers and staff to examine the contents of the storage unit without having their vision compromised.

The invention comprises a cover of the initially mentioned kind, said cover has a stationary cover plate extending parallel to said sides along a mid section of the storage unit and a rail system with a number of parallel transverse rails between the two longer sides, and that the lids are displaceable mounted between two adjacent rails of the rail system, said rails comprising separate tracks for the lids in each of the rows, whereby the lids in the rows are displaceable in a direction perpendicular to the longer sides. The lids are preferably essentially transparent.

Advantageously the lids of a cover according to the invention may be opened by displacement towards the centre of the merchandising unit under or over the stationary cover plate. Hereby, access may be provided along the entire length at both sides without creating a pump effect by operating the lids. In addition, good visual access is provided for easy examination of the contents of the merchandising unit, since the cover according to the invention provides for the possibility of simultaneous opening of a large percentage of the total top of the merchandising unit. By transparent lids, a good possibility of immediate visual examination of the contents is also ensured without having to open the cover and thereby initiate the unavoidable extra energy loss which this inevitably causes.

In the preferred embodiment of the invention, the rails are provided with three tracks, where the cover plate is arranged in a separate track, which is preferably the uppermost of the three tracks. By using three tracks and having the centre plate stationary arranged in the middle of the uppermost track, a cover is provided with each of the lids covering approx. ⅓ of the width of the top opening. Hereby, a total potential opening area of up to ⅔ of the entire opening of the merchandising unit offers unhindered access to the contents of the storage unit.

By designing the rails as profiles with three tracks, arrangement of the cover in three parallelly extending planes is allowed for. The two rows of lids are placed in the lower and the middle track, respectively, of the profiles. Hereby, the lids may be displaced independently of each other, not just in relation to the other lids in the same row, but also independently of the lids in the opposite row.

In a preferred embodiment of a cover according to the invention, the cover is plane. In this embodiment, the rails are straight.

In another preferred embodiment of the invention, the covers is provided with a curved shape as the rails are designed with a convex curvature whereby "free space" is provided above the goods in the storage compartment of the merchandising unit. The lids may be designed in an easily bendable plate material whereby the curvature does not necessarily have to be a circular curvature since the lids hereby would be able to adjust to the curvature of the rail sections which they at any given time are present in, once they are displaced back and forth between open and closed position.

The invention also refers to a merchandising storage unit for display of goods comprising a storage compartment having an essentially rectangular top opening which provides access to the storage compartment from both longer sides of the storage unit and a cover according to the first aspect described above. The storage compartment may be divided into two sections by means of a wall member arranged parallel to the longer sides, whereby the merchandising unit may be used for several groups of goods separated so that there is access to the groups of goods from both sides of the merchandising unit.

BRIEF DESCRIPTION OF THE FIGURES

The invention is described in detail in the following with reference to the accompanying drawings, in which.

DETAILED DESCRIPTION OF THE INVENTION

Figure 1:
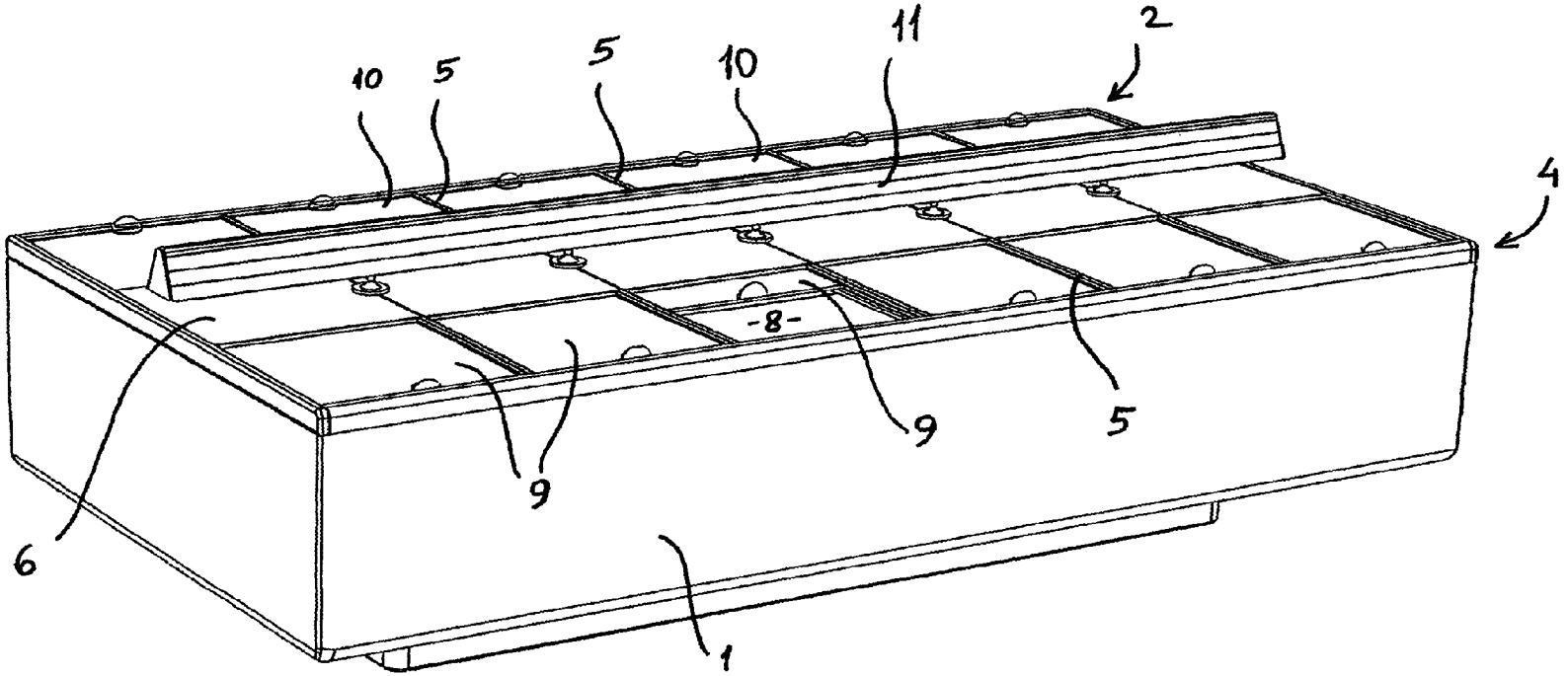
FIG. 1 is a perspective drawing of a merchandising unit displaying goods with a cover according to a first preferred embodiment of the invention.
Figure 2:
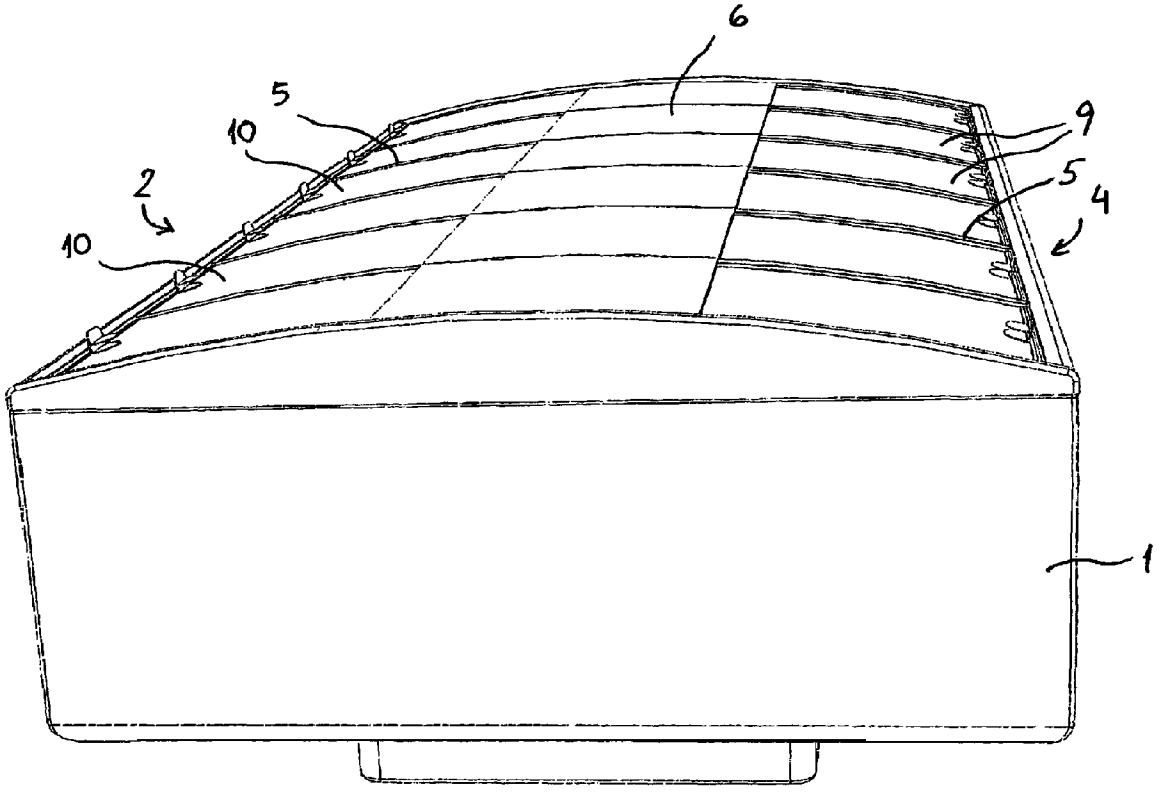
FIG. 2 is a perspective drawing of a merchandising unit displaying goods with a cover according to a second preferred embodiment of the invention.
Figure 3:
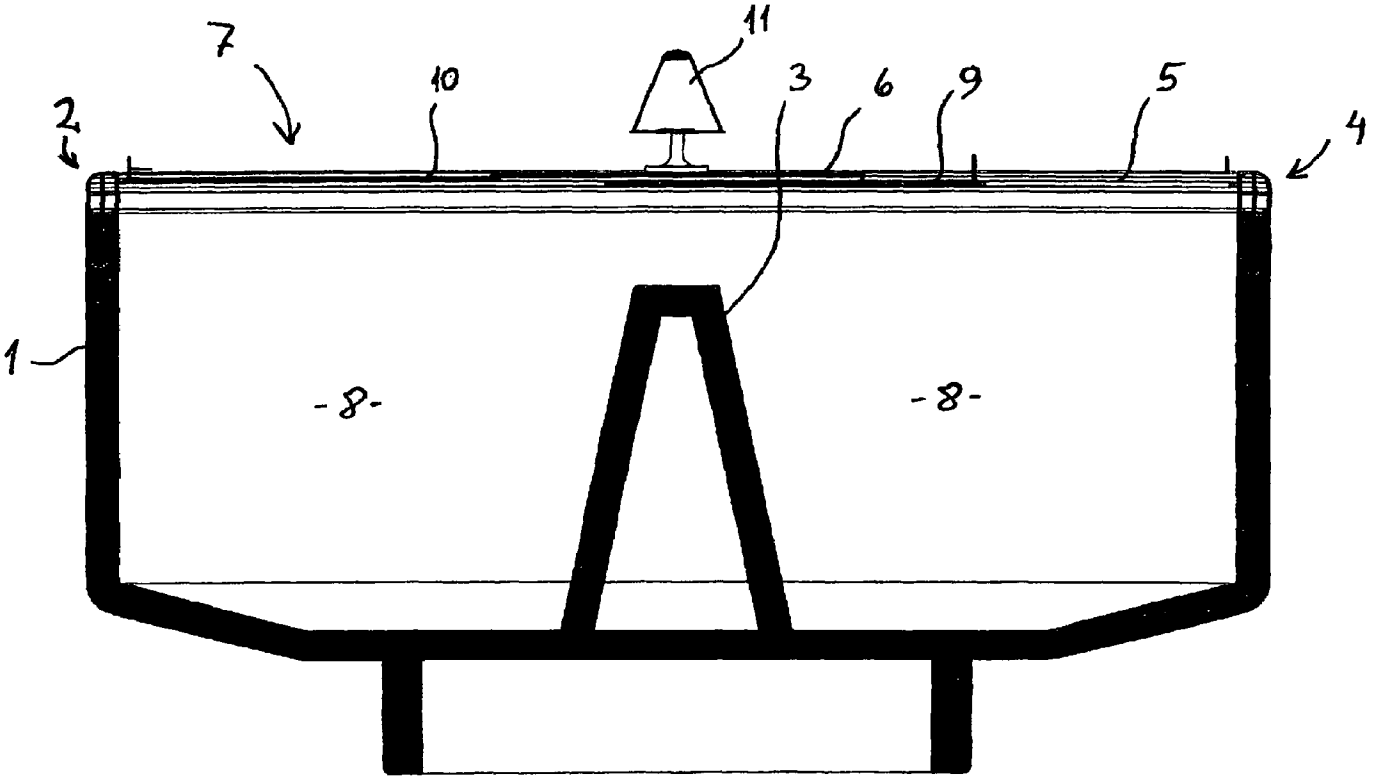
FIG. 3 is a cross-section of a merchandising unit displaying goods with a cover according to a preferred embodiment of the invention.

In FIGS. 1 to 3 are shown a merchandising unit for display and sale of refrigerated or frozen goods in a supermarket store or a similar store. As it is shown, the contents of the merchandising unit for display of goods are accessible from both longer sides 2, 4. These two longer sides, a first side 2 and a second side 4, respectively, are parallel and the merchandising unit 1 has an essentially rectangular basic shape. The merchandising unit 1 has a storage compartment 8, which may be divided into two sections by a partition wall 3 as shown in FIG. 3. The storage compartment 8 has a top opening 7 over which the cover in mounted.

The cover comprises a number of rails 5 arranged in parallel between the first and the second longer sides 2, 4 at a certain predetermined and preferably equal distance. The rails 5 have three substantially parallel tracks, in which the cover plates 6, 9, 10 are displaceably arranged. In the upper track, a centre plate 6 is permanently arranged. In each of the other tracks, a number of displaceable lids 9 are arranged so that they cover the opening between the centre plate 6 and the side edge 2, and in the third track on the rails 5 a number of displaceable lids 10 for covering the opening between the centre plate 6 and the second side 4 are correspondingly arranged.

The lids 9, 10 are arranged in two rows in such a way that they may be shifted between an open position, where they are completely or partially shifted in underneath the centre plate 6 from each side, and a closed position, where the lids 9, 10 abut the first and the second side edges of the sides 2, 4, respectively. The width of the two sets of lids 9, 10 is preferably substantially the same as the width of the centre plate 6. Hereby, the possibility of simultaneous opening of approx. ⅔ of the top opening 7 of the storage unit 1 is achieved. As is apparent from FIGS. 2 and 3, the lids 9,10 and the centre plate 6 are transparent so that there is unhindered access for visual orientation of the kinds of goods and their location in the merchandising unit 1.

On the centre plate 6, a display device 11 may be mounted, on which signs with e.g. price tags, special offers, etc. relating to the goods in the storage unit may be displayed.

As shown in FIG. 1, the cover of the storage unit 1 may be designed as a flat cover according to a first embodiment of the invention, since the rails 5 are straight and the cover plates 6, 9, 10 are plane.

In a second embodiment of the invention, the cover is designed with a curvature as shown in FIG. 2. The rails 5 are curved, so that the two rows of lids 9, 10 along both longer sides 2, 4 of the merchandising unit 1 and the centre plate 6 have a convex cover of the merchandising unit 1.

Figure 4:
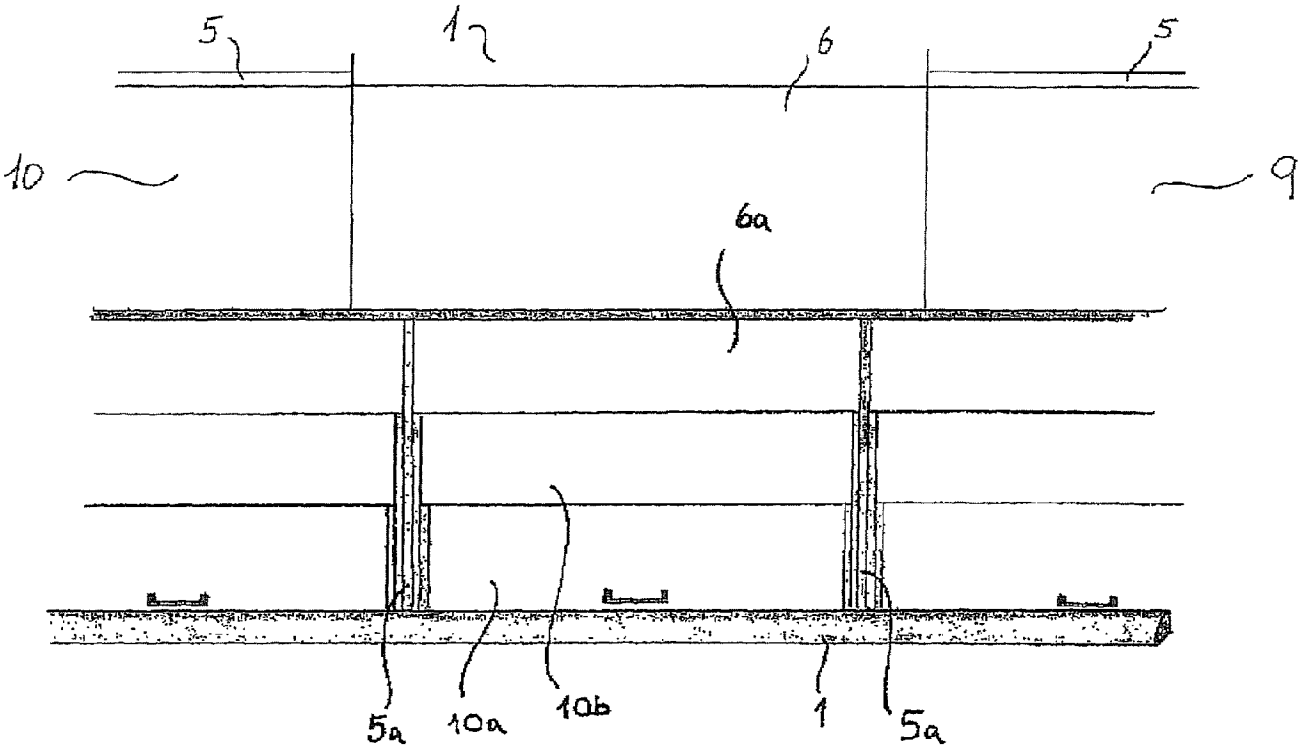
FIG. 4 is a detailed drawing of the embodiment of a cover in a corresponding end storage unit.

In FIG. 4 is shown an embodiment of the cover in an accompanying end storage unit which is located at the end of a merchandising unit of the type shown in FIGS. 1 and 2. The cover of the end storage unit is also divided into three sections so that a simultaneous opening of ⅔ of the top is possible. A fixed plate 6a is arranged at the back. Two displaceable plates 10a and 10b are arranged in a track 5a in front of the plate. The outermost plate 10a may be provided with a handle for operation of the cover.

The invention is described above with reference to two preferred embodiments. However, it is realised by the invention that the cover may be carried out in other variants than these without departing from the scope of the invention as specified in the accompanying claims.

The invention claimed is:

1. A merchandising storage unit for displaying goods comprising:

a storage compartment having a top opening and first and second opposing elongated sides disposed parallel to a longitudinal axis;

a stationary cover plate extending along the longitudinal axis and adjacent a mid section of the storage unit;

a first plurality of displaceable lids arranged generally horizontally along the first elongated side of the storage compartment and a second plurality of displaceable lids arranged generally horizontally along the second elongated side of the storage compartment, each of said lids including first and second opposing ends arranged generally transverse to the longitudinal axis; and a plurality of rails extending from the first elongated side to the second elongated side and having a convex curvature, each of said rails including at least three parallel tracks, wherein said at least three parallel tracks are arranged vertically relative to one another to form an upper track, a middle track, and a lower track, said tracks extending from the first elongated side to the second elongated side and following the convex curvature of said rails, wherein the cover plate is received and retained within the upper track of the plurality of rails and the first and second opposing ends of each of the displaceable lids are received and retained within corresponding middle tracks or lower tracks of the plurality of rails such that the displaceable lids are slidable along the convex curvature of the tracks in overlapping fashion underneath the cover plate.

2. A merchandising storage unit according to claim 1, wherein the storage compartment is divided into two sections by a wall member arranged parallel to the longer sides.

3. A merchandising storage unit according to claim 1, wherein an end storage unit is arranged at an end section of the merchandising storage unit, the end storage unit comprising a number of displaceable lids, which may be displaced away from an outer side of the end storage unit and towards an inner side of the end storage unit for opening thereof.

4. A merchandising storage unit according to claim 1, wherein each of the lids covers approximately ⅓ of a width of the top opening.

5. A merchandising storage unit according to claim 1, wherein the lids are configured to shift completely underneath said cover plate.

6. A merchandising storage unit according to claim 1, wherein a display device is mounted on said cover plate.

7. A merchandising storage unit according to claim 1, wherein said cover plate is flat.

*8. A storage unit, comprising:*

*a storage compartment having a first elongated side and a second elongated side opposite the first side, wherein the first and second sides are generally parallel with each other and define, at least in part, a rectangular top opening;*

*a stationary cover plate extending lengthwise along a longitudinal axis at a mid section of the storage compartment and parallel with the first and second elongated sides;*

*first displaceable lids arranged in a first row along the first elongated side and second displaceable lids arranged in a second row along the second elongated side, wherein the first and second lids are configured to provide access to the storage compartment from both the first and second elongated sides of the storage compartment; and*

*a rail system with a number of parallel mounted transverse rails between the first elongated side and the second elongated side, wherein the rails have a convex curvature,*

*wherein*

*the individual rails comprise two or more separate parallel tracks for the corresponding first and second lids in each of the rows,*

*the first and second lids are displaceably mounted between adjacent rails of the rail system, and*

*the first and second lids in the first and second rows, respectively, are configured to be displaceable in a direction perpendicular to the longitudinal axis.*

*9. The storage unit of claim 8 wherein each rail comprises a first track and a second track, and wherein the first and second tracks extend from the first elongated side to the second elongated side following the convex curvature of the corresponding rails.*

*10. The storage unit of claim 8 wherein:*

*the individual rails include at least three parallel tracks arranged vertically relative to one another to define a first track, a second track, and a third track,*

*the cover plate is received and retained within the first tracks of the rails; and*

*the first and second opposing ends of each of the displaceable lids are received and retained within corresponding second tracks or third tracks of the plurality of rails such that the displaceable lids are configured to be slidable along the convex curvature of the second and third tracks in overlapping fashion underneath the cover plate.*

*11. The storage unit of claim 8 wherein the cover plate has a curved shape.*

*12. The storage unit of claim 8 wherein the first and second lids are transparent.*

*13. The storage unit of claim 8 wherein the cover plate is transparent.*

*14. The storage unit of claim 8 wherein the top opening has a width, and wherein:*

*each first lid covers approximately ⅓ of the width of the top opening; and*

*each second lid covers approximately ⅓ of the width of the top opening.*

*15. A storage unit for displaying goods, the storage unit comprising:*

*a storage compartment having a top opening and first and second opposing elongated sides, wherein the first and second elongated sides are disposed parallel to a longitudinal axis; a stationary cover plate extending lengthwise along the longitudinal axis and adjacent a mid section of the storage compartment;*

*a plurality of first lids arranged along the first elongated side of the storage compartment, wherein individual first lids include opposing ends extending generally transverse to the longitudinal axis;*

*a plurality of second lids arranged along the second elongated side of the storage compartment, wherein individual second lids include opposing ends extending generally transverse to the longitudinal axis; and*

*a plurality of rails extending from the first elongated side to the second elongated side and having a convex curvature, wherein individual rails include at least two parallel tracks arranged vertically relative to one another to define a first track and a second track,*

*wherein the cover plate is received and retained within corresponding first tracks of the plurality of rails and the opposing ends of each of the first and second lids are received and retained within corresponding second tracks of the plurality of rails such that the first and second lids are configured to be slidably displaceable along the tracks in overlapping fashion underneath the cover plate.*

* * * * *